US012124186B2

(12) United States Patent
Nakaue et al.

(10) Patent No.: US 12,124,186 B2
(45) Date of Patent: Oct. 22, 2024

(54) IMAGE FORMING APPARATUS HAVING CONTROLLER TO CONTROL POTENTIAL BIAS APPLIED BETWEEN DEVELOPING ROLLER AND SUPPLY ROLLER ACCORDING TO CUMULATIVE DRIVE TIME

(71) Applicant: KYOCERA Document Solutions Inc., Osaka (JP)

(72) Inventors: Takahisa Nakaue, Osaka (JP); Masahito Ishino, Osaka (JP); Tomohiro Tamaki, Osaka (JP); Sueaki Okamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/350,630

(22) Filed: Jul. 11, 2023

(65) Prior Publication Data

US 2024/0027931 A1 Jan. 25, 2024

(30) Foreign Application Priority Data

Jul. 20, 2022 (JP) ................................ 2022-115660

(51) Int. Cl.
*G03G 15/08* (2006.01)
*G03G 15/06* (2006.01)
(Continued)

(52) U.S. Cl.
CPC ....... *G03G 15/065* (2013.01); *G03G 15/0806* (2013.01); *G03G 15/0808* (2013.01);
(Continued)

(58) Field of Classification Search
CPC ............ G03G 15/065; G03G 15/0806; G03G 15/0808; G03G 2215/0617
(Continued)

(56) References Cited

U.S. PATENT DOCUMENTS

2003/0118377 A1* 6/2003 Hirano .............. G03G 15/0812 399/284
2005/0047808 A1* 3/2005 Yamamura ......... G03G 15/0806 399/55
(Continued)

FOREIGN PATENT DOCUMENTS

JP 06194944 A * 7/1994
JP H 06-301281 A 10/1994
(Continued)

*Primary Examiner* — Robert B Beatty
(74) *Attorney, Agent, or Firm* — Stein IP LLC

(57) ABSTRACT

An image forming apparatus includes an image carrying member, a charging device, an exposure device, a developing device, a development voltage power supply, and a control section. The developing device includes a development container for containing a non-magnetic one-component developer composed only of a toner, a developer carrying member having an outer circumferential surface on which a toner layer is formed, and a toner supply member that supplies the toner to the developer carrying member. The control section performs control so that, as a cumulative drive time of the developing device increases, a supply voltage Vsdc becomes larger than a reference supply voltage and a development voltage Vdc becomes smaller than a reference development voltage, thus executing control to vary the development voltage Vdc and the supply voltage Vsdc so as to increase a potential difference Vsdc−Vdc between the supply voltage Vsdc and the development voltage Vdc.

4 Claims, 7 Drawing Sheets

(51) Int. Cl.

| | |
|---|---|
| *G03G 15/00* | (2006.01) |
| *G03G 15/02* | (2006.01) |
| *G03G 15/04* | (2006.01) |
| *G03G 15/20* | (2006.01) |
| *G03G 21/00* | (2006.01) |
| *G03G 21/02* | (2006.01) |

(52) U.S. Cl.
CPC ... *G03G 15/0266* (2013.01); *G03G 15/04036* (2013.01); *G03G 15/0865* (2013.01); *G03G 15/2092* (2013.01); *G03G 15/5004* (2013.01); *G03G 21/0011* (2013.01); *G03G 21/02* (2013.01); *G03G 2215/0617* (2013.01)

(58) Field of Classification Search
USPC .............................................. 399/43, 55, 285
See application file for complete search history.

(56) References Cited

U.S. PATENT DOCUMENTS

| | | | | |
|---|---|---|---|---|
| 2008/0181652 | A1* | 7/2008 | Sato ..................... | G03G 15/065 399/83 |
| 2008/0317482 | A1* | 12/2008 | Niijima .............. | G03G 15/0856 399/27 |
| 2012/0189355 | A1* | 7/2012 | Mitsunobu ......... | G03G 15/0887 399/258 |
| 2014/0348555 | A1* | 11/2014 | Sato ................... | G03G 15/0865 399/281 |

FOREIGN PATENT DOCUMENTS

| | | | |
|---|---|---|---|
| JP | 2006-221102 | A | 8/2006 |
| JP | 2006-349760 | A | 12/2006 |

* cited by examiner

IMAGE FORMING APPARATUS HAVING CONTROLLER TO CONTROL POTENTIAL BIAS APPLIED BETWEEN DEVELOPING ROLLER AND SUPPLY ROLLER ACCORDING TO CUMULATIVE DRIVE TIME

INCORPORATION BY REFERENCE

This application is based upon and claims the benefit of priority from the corresponding Japanese Patent Application No. 2022-115660, filed on Jul. 20, 2022, the entire contents of which are incorporated herein by reference.

BACKGROUND

The present disclosure relates to an image forming apparatus using an electrophotographic process, such as a copy machine, a printer, or a facsimile, and relates particularly to an image forming apparatus including a developing device of a non-magnetic one-component development type.

Known types of developing devices used in image forming apparatuses employing an electrophotographic method, such as a copy machine, a printer, a facsimile, and a multi-functional peripheral equipped with functions of these apparatuses, include a two-component development type using a toner and a carrier as a developer and a one-component development type using only a toner without using a carrier.

In a developing device of the non-magnetic one-component development type using a non-magnetic toner, a regulation blade as a developer regulation member is disposed so as to be in contact with a surface of a developing roller that is a developer carrying member. Further, the toner is conveyed by microscopic asperities provided on the surface of the developing roller and is regulated by the regulation blade so that any excess of the toner is removed, thus being formed into a thin toner layer. Furthermore, when the toner passes below the regulation blade, the surface of the developing roller and the toner become charged by friction therebetween. Further, a photosensitive member and the developing roller are rotated in contact with each other, and thus, under an electric field, the toner on the surface of the developing roller is developed on the photosensitive member.

In the non-magnetic one-component development type described above, since the toner layer on the developing roller is a thin layer formed of one or two layers, after development for printing of a high coverage rate image such as a so-called solid image, which consumes a large amount of the toner, almost no toner is left on the developing roller. Thus, in order for subsequent development to be performed effectively, it is required that a sufficient amount of the toner be supplied onto the developing roller. In a case where an amount of the toner supplied onto the developing roller is insufficient, in a region of an image formed subsequently to formation of a solid image, an afterimage (a development ghost) of the solid image might appear at a position delayed by a rotation cycle of the developing roller from a position of the solid image.

SUMMARY

An image forming apparatus according to an aspect of the present disclosure includes an image carrying member, a charging device, an exposure device, a developing device, a development voltage power supply, and a control section. The image carrying member includes a photosensitive layer formed on a surface thereof. The charging device charges the image carrying member to a prescribed surface potential. The exposure device exposes to light the surface of the image carrying member charged by the charging device so as to form thereon an electrostatic latent image with attenuated electrostatic charge. The developing device includes a development container for containing a non-magnetic one-component developer composed only of a toner, a developer carrying member that is brought into pressure contact at a prescribed pressing force with the image carrying member and has an outer circumferential surface on which the toner is carried to form a toner layer, a toner supply member that is brought into pressure contact at a prescribed pressing force with the developer carrying member and supplies the toner to the developer carrying member, and a regulation blade that contacts the outer circumferential surface of the developer carrying member so as to regulate a thickness of the toner layer formed on the outer circumferential surface of the developer carrying member. The developing device supplies the toner to the image carrying member on which the electrostatic latent image is formed. The development voltage power supply applies a development voltage Vdc to the developer carrying member and a supply voltage Vsdc to the toner supply member. The control section controls the developing device and the development voltage power supply. The control section performs control so that, as a cumulative drive time of the developing device from a start of use of the developing device increases, the supply voltage Vsdc becomes larger than a reference supply voltage and the development voltage Vdc becomes smaller than a reference development voltage, thus executing control to vary the development voltage Vdc and the supply voltage Vsdc so as to increase a potential difference Vsdc−Vdc between the supply voltage Vsdc and the development voltage Vdc.

DETAILED DESCRIPTION

1. Overall Configuration of Image Forming Apparatus 1

Figure 1:
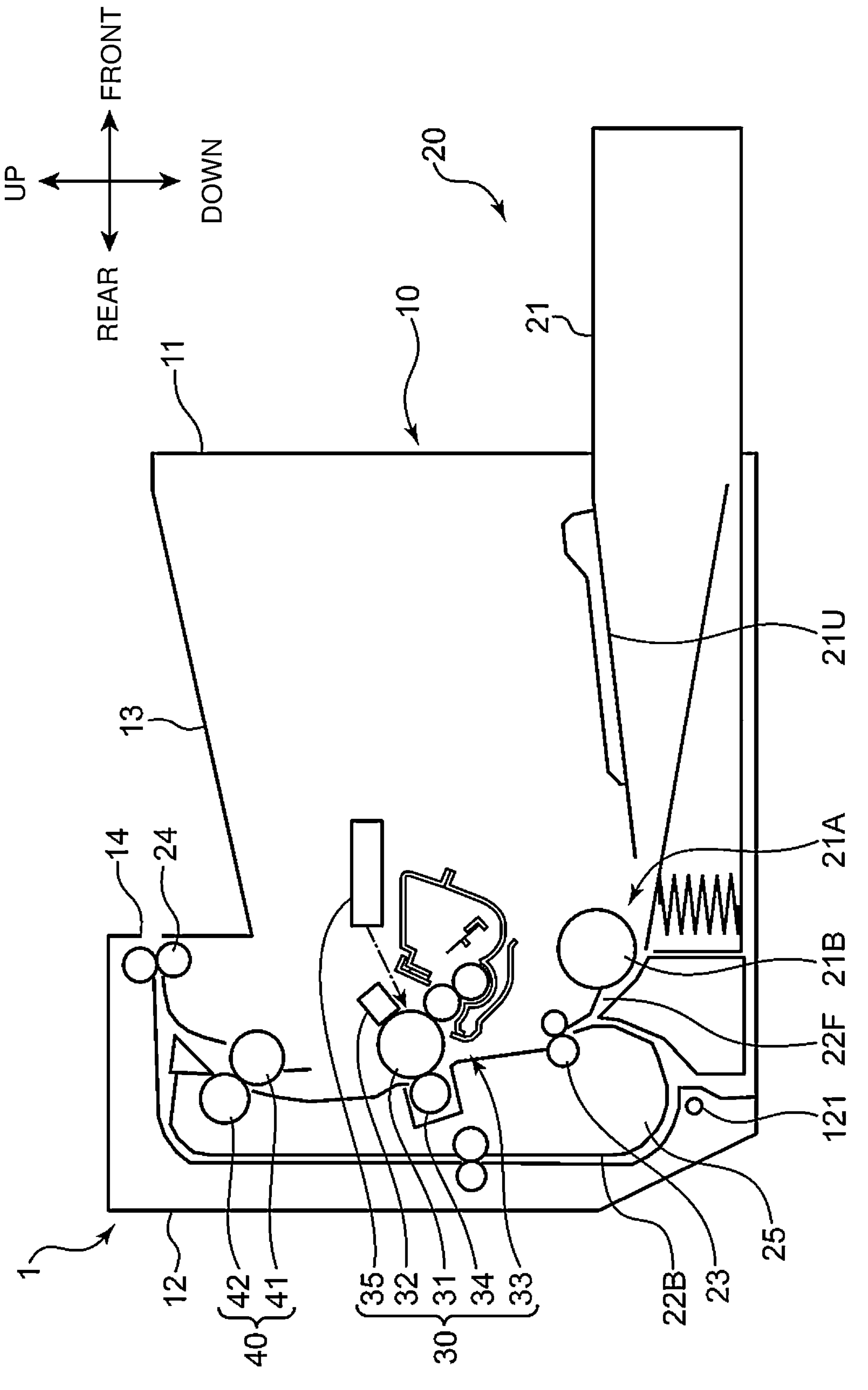
FIG. 1 is a sectional side view showing a schematic configuration of an image forming apparatus according to an embodiment of the present disclosure.

With reference to the appended drawings, the following describes an embodiment of the present disclosure. FIG. 1 is a sectional side view showing a schematic configuration of an image forming apparatus 1 according to an embodiment of the present disclosure. In FIG. 1, a right side corresponds to a front side of the image forming apparatus 1, and a left side corresponds to a rear side thereof.

The image forming apparatus 1 (herein, a monochrome printer) includes, in addition to a main body housing 10 having a housing structure substantially in a rectangular parallelepiped shape, a paper feed section 20, an image forming section 30, and a fixing portion 40, which are housed in the main body housing 10. The main body housing 10 includes a front cover 11 provided on a front surface side thereof and a rear cover 12 provided on a rear surface side thereof. When the rear cover 12 is opened, respective units of the image forming section 30 and the fixing portion 40 can be inserted in or taken out of the main body housing 10 from the rear surface side thereof. Furthermore, on an upper surface of the main body housing 10, there is provided a paper discharge portion 13 to which a sheet after being subjected to image formation is discharged. In the following description, a term "sheet" refers to a copy sheet, a sheet of coated paper, an OHP sheet, a sheet of cardboard, a postcard, a sheet of tracing paper, or any other sheet material to be subjected to image forming processing.

The paper feed section 20 includes a paper feed cassette 21 for housing sheets to be subjected to image forming processing. The paper feed cassette 21 has a part protruding further forward from a front surface of the main body housing 10. An upper surface of a part of the paper feed cassette 21 housed in the main body housing 10 is covered with a paper feed cassette top plate 21U. The paper feed cassette 21 is provided with a sheet housing space for housing a bundle of sheets, a lift plate with which the bundle of sheets is lifted so as to be fed, and so on. A sheet feed-out portion 21A is provided above a rear end side of the paper feed cassette 21. In the sheet feed-out portion 21A, there is disposed a paper feed roller 21B for feeding out a topmost sheet one by one from the bundle of sheets in the paper feed cassette 21.

The image forming section 30 performs an image forming operation in which a toner image (a developer image) is formed on a sheet sent out from the paper feed section 20. The image forming section 30 includes, in addition to a photosensitive drum 31, a charging portion 32, an exposure portion 35, a developing portion 33, and a transfer roller 34, which are disposed around the photosensitive drum 31.

The photosensitive drum 31 (an image carrying member) includes a rotary shaft and an outer circumferential surface (a drum main body) that rotates about the rotary shaft. The photosensitive drum 31 is formed of, for example, a known organic photoconductor (OPC), and a photosensitive layer composed of an electric charge generation layer, an electric charge transport layer, and so on is formed on the outer circumferential surface thereof. After the photosensitive layer is uniformly charged by the after-mentioned charging portion 32, light is applied thereto by the exposure portion 35 so that an electrostatic latent image with attenuated electrostatic charge is formed thereon, and by the developing portion 33, the electrostatic latent image is visualized into a toner image, which is thus carried on the photosensitive layer.

Figure 2:
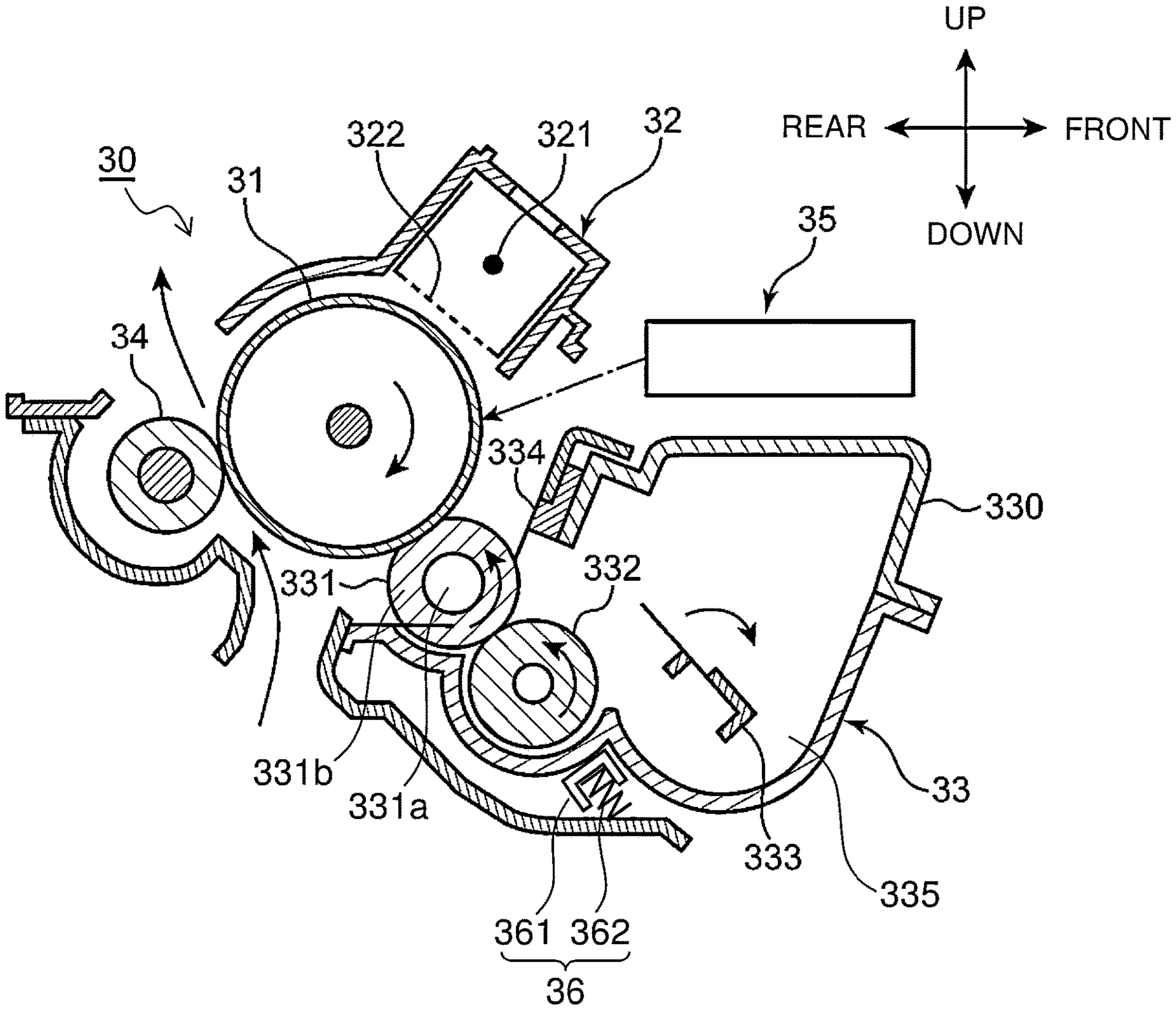
FIG. 2 is a sectional side view showing a schematic configuration of an image forming section of the image forming apparatus of the present embodiment.

The charging portion 32 (a charging device) is disposed at a prescribed distance from the outer circumferential surface of the photosensitive drum 31 and uniformly charges the outer circumferential surface of the photosensitive drum 31 without contacting it. Specifically, the charging portion 32 includes a charge wire 321 and a grid electrode 322 (both are shown in FIG. 2). The charge wire 321 is a linear electrode extending in a rotation axis direction of the photosensitive drum 31 and generates corona discharge between itself and the photosensitive drum 31. The grid electrode 322 is a grid-shaped electrode extending in the rotation axis direction of the photosensitive drum 31 and is placed between the charge wire 321 and the photosensitive drum 31. In the charging portion 32, a current having a prescribed current value is passed through the charge wire 321 so that corona discharge is generated, and a prescribed voltage is applied to the grid electrode 322, and thus the outer circumferential surface of the photosensitive drum 31 opposed to the grid electrode 322 is uniformly charged to a prescribed surface potential.

The exposure portion 35 (an exposure device) includes a laser light source and optical system instruments such as a mirror and a lens and applies, to the outer circumferential surface of the photosensitive drum 31, light modulated based on image data provided from an external apparatus such as a personal computer. With this configuration, the exposure portion forms, on the outer circumferential surface of the photosensitive drum 31, an electrostatic latent image corresponding to an image based on the image data.

The developing portion 33 (a developing device) is demountably mounted in the main body housing 10 and supplies a toner (a non-magnetic one-component developer) to the outer circumferential surface of the photosensitive drum 31 so as to develop an electrostatic latent image formed on the outer circumferential surface of the photosensitive drum 31. To develop an electrostatic latent image means to visualize the electrostatic latent image into a toner image (a developer image). A detailed configuration of the developing portion 33 will be described later.

The transfer roller 34 is a roller for transferring, onto a sheet, a toner image formed on the outer circumferential surface of the photosensitive drum 31. Specifically, the transfer roller 34 has an outer circumferential surface that axially rotates and is opposed to the outer circumferential surface of the photosensitive drum 31 at a position on a downstream side relative to a developing roller 331 in a rotation direction of the photosensitive drum 31. The transfer roller 34 transfers the toner image carried on the outer circumferential surface of the photosensitive drum 31 to a sheet passing through a nip between itself and the outer circumferential surface of the photosensitive drum 31. During this transfer, a transfer voltage having a polarity opposite to that of the toner is applied to the transfer roller 34.

The fixing portion 40 performs fixing processing in which a toner image transferred to a sheet is fixed on the sheet. The fixing portion 40 includes a fixing roller 41 and a pressing roller 42. The fixing roller 41 includes therein a heating source and heats the toner transferred to the sheet at a prescribed temperature. The pressing roller 42 is brought into pressure contact with the fixing roller 41, thus forming a fixing nip between itself and the fixing roller 41. When the sheet to which the toner image has been transferred is passed through the fixing nip, the toner image is fixed on the sheet under heat applied by the fixing roller 41 and by being pressed by the pressing roller 42.

In the main body housing 10, there are provided a main conveyance path 22F and an inversion conveyance path 22B, which are used for sheet conveyance. The main conveyance path 22F extends from the sheet feed-out portion 21A in the paper feed section 20 to a paper discharge port 14 provided to be opposed to the paper discharge portion 13 on the upper surface of the main body housing 10 via the image forming section 30 and the fixing portion 40. The inversion conveyance path 22B is a conveyance path used in duplex printing on a sheet, along which the sheet with one side thereof having been subjected to printing is conveyed back to an upstream side of the image forming section 30 in the main conveyance path 22F.

The main conveyance path 22F is provided to extend so as to pass upward from below through a transfer nip formed by the photosensitive drum 31 and the transfer roller 34. Furthermore, a registration roller pair 23 is disposed on an upstream side relative to the transfer nip in the main conveyance path 22F. At the registration roller pair 23, conveyance of a sheet is once stopped so that the sheet is subjected to skew correction, and then the sheet is sent out to the transfer nip at a prescribed timing for image transfer. At suitable locations in the main conveyance path 22F and the inversion conveyance path 22B, there is disposed a plurality of conveyance rollers used for sheet conveyance. A paper discharge roller pair 24 is disposed in a neighborhood of the paper discharge port 14.

The inversion conveyance path 22B is formed between an outside surface of an inversion unit 25 and an inner surface of the rear cover 12 of the main body housing 10. The transfer roller 34 and one of rollers constituting the regulation roller pair 23 are mounted on an inside surface of the inversion unit 25. The rear cover 12 and the inversion unit 25 are each axially pivotable about a supporting point 121 provided at a lower end thereof. Upon occurrence of a jam (a paper jam) in the inversion conveyance path 22B, the rear cover 12 is opened. Upon occurrence of a jam in the main conveyance path 22F or in a case where a unit of the photosensitive drum 31 or the developing portion 33 is taken outside, not only the rear cover 12 but also the inversion unit 25 is opened.

2. Configuration of Image Forming Section 30

Figure 3:
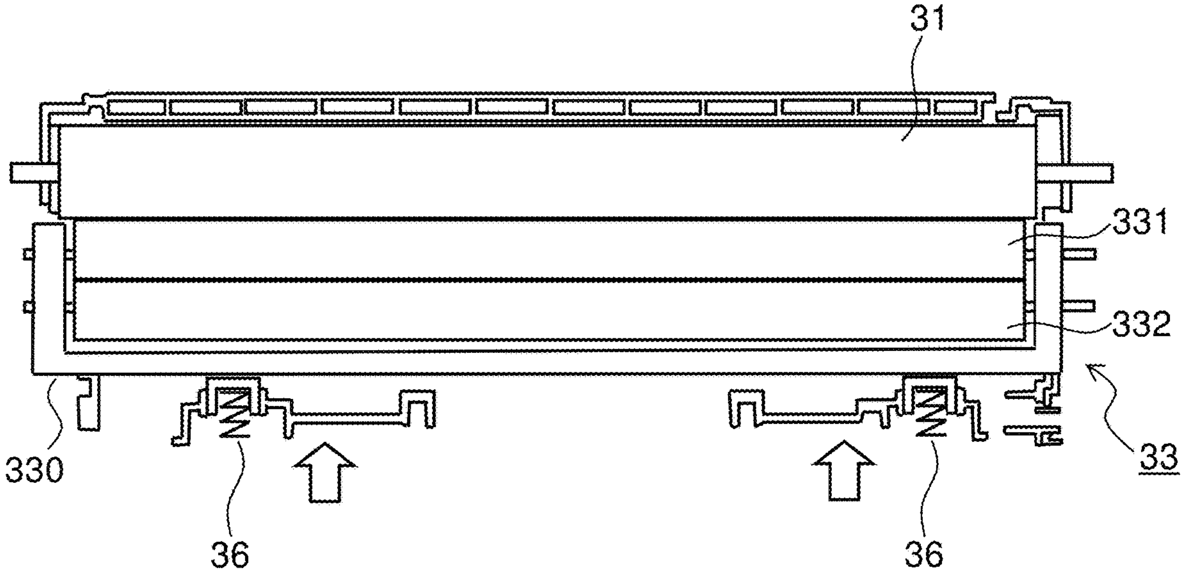
FIG. 3 is a plan view, as seen from above, of a vicinity of a contact part between a photosensitive drum and a developing roller of a developing portion.
Figure 4:
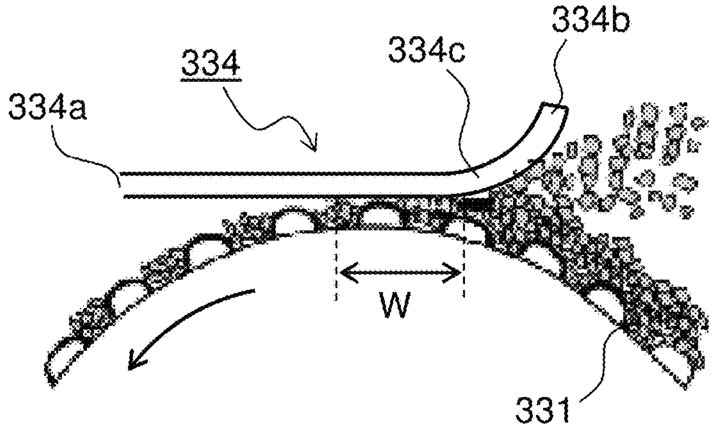
FIG. 4 is an enlarged sectional view of a vicinity of a contact part between the developing roller and a regulation blade in the developing portion.
Figure 5:
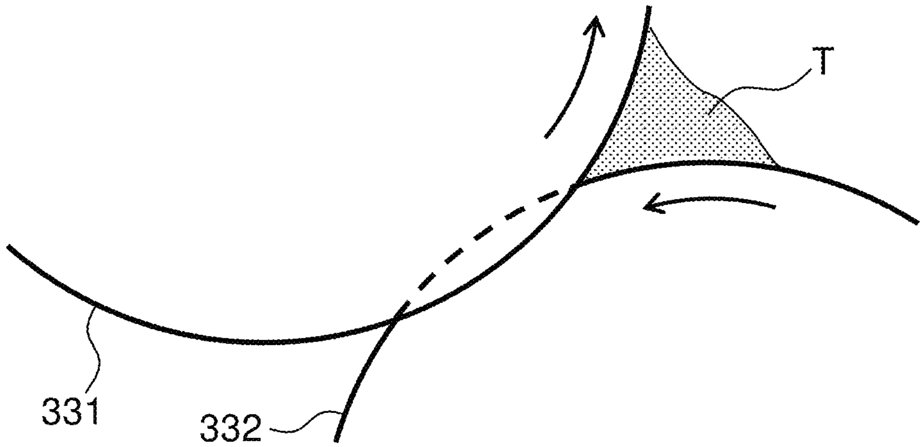
FIG. 5 is an enlarged sectional view of an abutment part between the developing roller and a supply roller.

FIG. 2 is a sectional view of the image forming section 30 in the image forming apparatus 1 of the present embodiment. FIG. 3 is a plan view, as seen from above, of a vicinity of a contact part between the photosensitive drum 31 and the developing roller 331 of the developing portion 33. FIG. 4 is an enlarged sectional view of a vicinity of a contact part between the developing roller 331 and a regulation blade 334 in the developing portion 33. FIG. 5 is an enlarged sectional view of an abutment part between the developing roller 331 and a supply roller 332.

As shown in FIG. 2 and FIG. 3, the developing portion 33 includes a development housing 330 (a development container), the developing roller 331 (a developer carrying member), the supply roller 332, an agitation paddle 333, and the regulation blade 334.

The development housing 330 contains therein a non-magnetic one-component developer composed only of a toner and houses the developing roller 331, the supply roller 332, the regulation blade 334, and so on. The development housing 330 includes an agitation chamber 335 for containing the developer (the toner) in an agitated state. The agitation paddle 333 is disposed in the agitation chamber 335. The agitation paddle 333 is used to agitate the toner in the agitation chamber 335.

The developing roller 331 includes a rotary shaft 331*a* and a roller portion 331*b*. The rotary shaft 331*a* is rotatably supported to bearings (not shown) provided in the development housing 330. The roller portion 331*b* is a cylindrical member stacked on an outer circumferential surface of the rotary shaft 331*a* and is configured by stacking, on a surface of a base rubber (for example, silicone rubber), a coat layer formed of an uneven coating material such as urethane. The roller portion 331*b* rotates integrally with the rotary shaft 331*a* as the rotary shaft 331*a* rotates. A toner layer (a developer layer) having a prescribed thickness is formed on a surface of the roller portion 331*b*. A thickness of the toner layer is regulated (uniformly adjusted to a prescribed thickness) by the after-mentioned regulation blade 334. The toner layer becomes charged with static electricity generated upon abutting of the toner layer on the regulation blade 334.

At a position opposed to the photosensitive drum 31, the developing roller 331 rotates in a direction (a counterclockwise direction in FIG. 2) directed from an upstream side to a downstream side in a rotation direction of the photosensitive drum 31 (a clockwise direction in FIG. 2). That is, at the position opposed to the photosensitive drum 31, the developing roller 331 rotates in the same direction as the rotation direction of the photosensitive drum 31.

The supply roller 332 is disposed to be opposed to the developing roller 331. The supply roller 332 holds, on an outer circumferential surface thereof, the developer contained in the agitation chamber 335. Furthermore, the supply roller 332 supplies the developer held on the outer circumferential surface thereof to the developing roller 331.

At a position opposed to the developing roller 331, the supply roller 332 rotates in a direction (the counterclockwise direction in FIG. 2) directed from a downstream side to an upstream side in the rotation direction of the developing roller 331 (the counterclockwise direction in FIG. 2). That is, at the position opposed to the developing roller 331, the supply roller 332 rotates in an opposite direction to the rotation direction of the developing roller 331. In order to cause the toner to move from the supply roller 332 to the developing roller 331, a prescribed supply voltage (a direct-current voltage) is applied to the supply roller 332.

The developing roller 331 is supplied with the developer from the supply roller 332 and holds the toner layer on an outer circumferential surface thereof. Further, the developing roller 331 supplies the developer to the photosensitive drum 31. The developing roller 331 and the supply roller 332 each have a length in an axial direction (a direction orthogonal to a drawing plane of FIG. 2) substantially equal to a length of the photosensitive drum 31 in the axial direction. In order to cause the toner to move from the developing roller 331 to the photosensitive drum 31, a prescribed development voltage (a direct-current voltage) is applied to the developing roller 331.

In the image forming section 30, a pressing mechanism 36 composed of a pressing member 361 and a pressing spring 362 is disposed on an opposite side to the photosensitive drum 31 via the development housing 330 (a lower right side in FIG. 2, a lower side in FIG. 3). The pressing mechanism 36 is disposed at each of two locations on the development housing 330 along a longitudinal direction thereof (at positions 85 mm away from a center of the photosensitive drum 31 in the axial direction). When the developing portion 33 is attached to the image forming section 30, the development housing 330 is brought into pressure contact with the pressing member 361 and thus is pressed in a direction toward the photosensitive drum 31 (an upper left direction in FIG. 2, an upper direction in FIG. 3), so that the developing roller 331 is pressed at a prescribed pressing force against the photosensitive drum 31. The developing portion 33 and the photosensitive drum 31 have no mechanism for regulating a distance between the developing roller 331 and the photosensitive drum 31, namely, no mechanism for regulating a pressing force of the developing roller 331 with respect to the photosensitive drum 31.

The regulation blade 334 is a thin plate-shaped member made of metal. The regulation blade 334 is configured so that a proximal end 334*a* thereof is secured to the development housing 330 and a distal end 334*b* thereof is a free end. At a position on an upstream side relative to a position at which the photosensitive drum 31 is opposed to the developing roller 331 in the rotation direction of the developing roller 331, the regulation blade 334 contacts the outer circumferential surface of the developing roller 331.

The regulation blade 334 is flexibly deformable, and there is a contact part (a nip) between the reregulate blade 334 and the developing roller 331 in a circumferential direction of the developing roller 331. The regulation blade 334 abuts on the outer circumferential surface of the developing roller 331 (the roller portion 331*b*) at a prescribed regulation pressure and with a prescribed nip width W.

The regulation blade 334 is made of, for example, stainless steel (SUS304) and has a free length of 10 mm in the present embodiment. The distal end 334*b* of the regulation blade 334 is bent so that a curved part 334*c* is formed. The curved part 334*c* abuts on the outer circumferential surface of the developing roller 331. The curved part 334*c* has a radius of curvature of not less than 0.1 mm.

As shown in FIG. 4, the regulation blade 334 abuts on the developing roller 331 at a prescribed regulation pressure (contact linear pressure), and thus the toner layer carried on the outer circumferential surface of the developing roller 331 is adjusted to be uniform in thickness. With this configuration, the regulation blade 334 regulates an amount of the toner on the outer circumferential surface of the developing roller 331. Furthermore, the regulation blade 334 rubs on the toner carried on the outer circumferential surface of the developing roller 331 and thus charges the toner. The contact linear pressure of the regulation blade 334 with respect to the developing roller 331 refers to a contact pressure per unit length of the regulation blade 334 at a contact position between the regulation blade 334 and the outer circumferential surface of the developing roller 331.

As shown in FIG. 5, the abutment part (a nip) between the developing roller 331 and the supply roller 332 has a configuration in which the developing roller 331 bites into the supply roller 332. Furthermore, a toner pool T is formed on a downstream side (an upper right side in FIG. 5) of the nip in the rotation direction of the developing roller 331.

It is known that, when the developing roller 331 and the supply roller 332 are in linear contact with each other at the nip, the toner pool T is not formed, which results in a significant decrease in toner supply property. To avoid this, it is required that an inter-shaft distance between the developing roller 331 and the supply roller 332 and respective diameters and hardnesses thereof be designed so that an amount of biting of the developing roller 331 into the supply roller 332 is appropriate. The developing roller 331 contacts the photosensitive drum 31, which is a hard member, and thus is designed to have an Asker C hardness of about 50 to 80. In order, therefore, to achieve the configuration in which the developing roller 331 bites into the supply roller 332, it is required that the supply roller 332 have a hardness lower than that of the developing roller 331.

When a potential difference is generated between the supply roller 332 and the developing roller 331, by electric field energy or the van der Waals force, the toner is supplied from the supply roller 332 to the developing roller 331. Here, in a case where the supply roller 332 and the developing roller 331 have high resistance values, a decreased effective electric field is generated, which results in a decrease in toner supply performance. In order to maintain a toner charge amount so as to retain developability with respect to the photosensitive drum 31, it is desirable that the developing roller 331 have a resistance value of about $1\times10^5$ Ω to $1\times10^9$ Ω. That is, in order to obtain such an effective electric field that the toner supply property can be retained within a range of the resistance value of the developing roller 331, it is required that the supply roller 332 have a resistance value of not less than $1\times10^2$ Ω and not more than $1\times10^4$ Ω. In order to improve density followability of a solid image (a capability to achieve no density difference between a leading edge and a trailing edge of the image), it is also important that a compression load with which the supply roller 332 is pressed against the developing roller 331 be set to be in an optimum range.

3. Control Paths of Image Forming Apparatus 1

Figure 6:
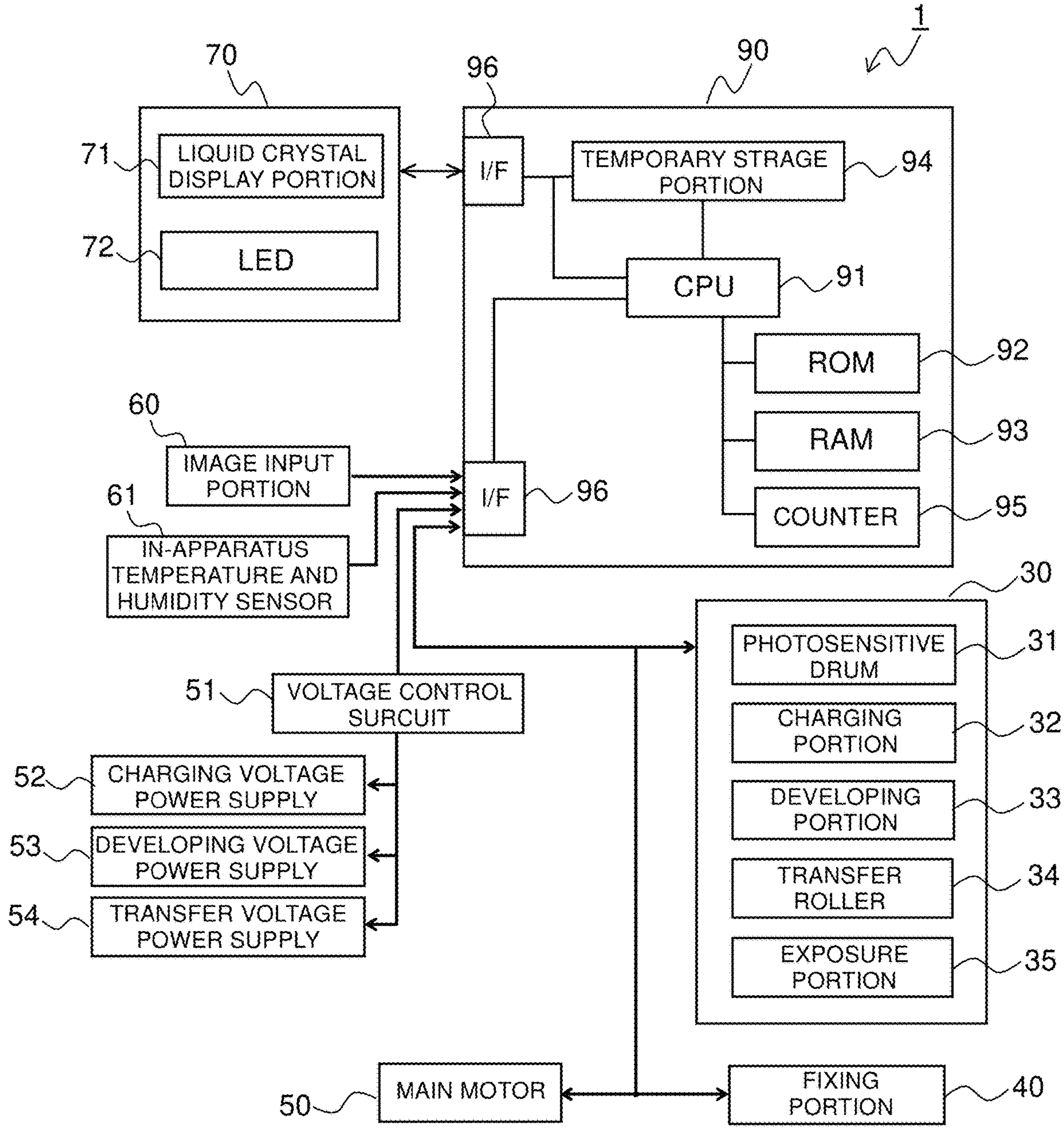
FIG. 6 is a block diagram showing an example of control paths used in the image forming apparatus of the present embodiment.

FIG. 6 is a block diagram showing an example of control paths used in the image forming apparatus 1 of the present embodiment. In using the image forming apparatus 1, the various portions therein are controlled in different ways, and thus the image forming apparatus 1 as a whole has complicated control paths. Thus, herein, a description of the control paths is made with emphasis on some of the control paths required for implementing the present disclosure.

Based on output signals from a control section 90, a main motor 50 drives to rotate, in addition to the paper feed roller 21B and the photosensitive drum 31, the developing roller 331, the supply roller 332, and the agitation paddle 333 in the developing portion 33, the fixing roller 41 in the fixing portion 40, and so on at prescribed respective rotation speeds.

A voltage control circuit 51 is connected to a charging voltage power supply 52, a development voltage power supply 53, and a transfer voltage power supply 54 and, based on output signals from the control section 90, operates these power supplies. Based on a control signal from the voltage control circuit 51, the charging voltage power supply 52 applies a charging voltage to the charge wire 321 in the charging portion 32. The development voltage power supply 53 applies a development voltage to the developing roller 331 in the developing portion 33 and a supply voltage to the supply roller 332 in the developing portion 33. The transfer voltage power supply 54 applies a transfer voltage to the transfer roller 34.

An image input portion 60 is a reception portion that receives image data transmitted from a personal computer or the like to the image forming apparatus 1. An image signal inputted from the image input portion 60 is converted into a digital signal, which then is sent out to a temporary storage portion 94.

An in-apparatus temperature and humidity sensor 61 detects a temperature and a humidity inside the image forming apparatus 1, particularly a temperature and a humidity in a vicinity of the developing portion 33, and is disposed in a neighborhood of the image forming section 30.

An operation section 70 is provided with a liquid crystal display portion 71 and an LED 72 that indicates various states and thus functions to indicate a status of the image forming apparatus 1 and to display an image forming situation and the number of printed copies. Various settings for the mage forming apparatus 1 are made via a printer driver of a personal computer.

The control section 90 includes at least a CPU (central processing unit) 91 as a central computation processor, a ROM (read-only memory) 92 that is a read-only storage portion, a RAM (random-access memory) 93 that is a readable and writable storage portion, the temporary storage portion 94 that temporarily stores image data and so on, a counter 95, and a plurality of (herein, two) I/Fs (interfaces) 96 that transmits control signals to the various devices in the image forming apparatus 1 and receives input signals from the operation section 70.

The ROM 92 contains, for example, data not to be changed during use of the image forming apparatus 1, such as control programs for the image forming apparatus 1 and numerical values required for control. The RAM 93 stores, for example, data necessitated when control of the image forming apparatus 1 is in progress and data temporarily required for controlling the image forming apparatus 1.

The temporary storage portion 94 temporarily stores an image signal inputted from the image input portion 60, which receives image data transmitted from a personal computer or the like, and converted into a digital signal. The counter 95 cumulatively counts the number of printed sheets.

Furthermore, the control section 90 transmits control signals from the CPU 91 to the various portions and devices in the image forming apparatus 1 via the I/Fs 96. Furthermore, from the various portions and devices, signals indicating respective statuses thereof and input signals are transmitted to the CPU 91 via the I/Fs 96. Examples of the various portions and devices controlled by the control section 90 include the image forming section 30, the fixing portion 40, the main motor 50, the voltage control circuit 51, the image input portion 60, and the operation section 70.

4.Control to Vary Development Voltage and Supply Voltage

The following describes control to vary a development voltage to be applied to the developing roller 331 and a supply voltage to be applied to the supply roller 332, which characterizes the image forming apparatus 1 of the present embodiment. As deterioration and consumption of the toner in the developing portion 33 progress due to endurance printing, fluidity of the toner varies to decrease an amount of the toner supplied from the supply roller 332 to the developing roller 331. As a result, there occur a decrease in density followability and density irregularities of a solid image. When, on the other hand, an excessively large amount of the toner is supplied from the supply roller 332 to the developing roller 331, an amount of the toner consumed in the developing portion 33 is increased. As a result, a preset life of the developing portion 33 (a period of time up to when the toner in the developing portion 33 runs out) cannot be achieved.

As a solution thereto, in the image forming apparatus 1 of the present embodiment, there is performed control to vary the development voltage and the supply voltage in accordance with a cumulative drive time (a cumulative number of sheets printed) from a start of use of the developing portion 33, and thus while an amount of the toner consumed in the developing portion 33 is maintained constant, there are suppressed occurrences of a decrease in density followability and density irregularities of a solid image. The following describes, in detail, the control to vary the development voltage and the supply voltage.

First, an endurance printing test was conducted using the development voltage and the supply voltage that were made to vary to study an effect of suppressing a decrease in density followability and density irregularities and an effect of stabilizing an amount of the toner consumed in the developing portion 33, which were provided by the control to vary the development voltage and the supply voltage. The image forming apparatus 1 (manufactured by KYOCERA Document Solutions Inc.) shown in FIG. 1 was used as a test apparatus.

As the developing roller 331, there was used a roller including the roller portion **331*b* and the rotary shaft 331*a* and having an Asker C hardness of 55°. The roller portion 331*b* included, as a base material layer, a silicone rubber layer having a thickness of 3.5 mm and coated with a urethane coating and had an outer diameter of 13 mm, a length of 232 mm in the axial direction, and a resistance value of 7.1 [logΩ]. The rotary shaft 331*a* had a shaft diameter of 6 mm. A linear speed of the developing roller 331 was set to 195 mm/sec. A constant pressure load instrument (CL-150 manufactured by Kobunshi Keiki Co., Ltd.) was used to measure an Asker C hardness. For measurement of a resistance value, the developing roller 331** was rotated in contact with a metal roller, and a direct-current voltage of 100 V was applied thereto.

As the photosensitive drum 31, there was used a positively-charged single-layer OPC photosensitive drum (manufactured by KYOCERA Document Solutions Inc.) having an outer diameter of 24 mm and a photosensitive layer thickness of 22 μm.

Figure 7:
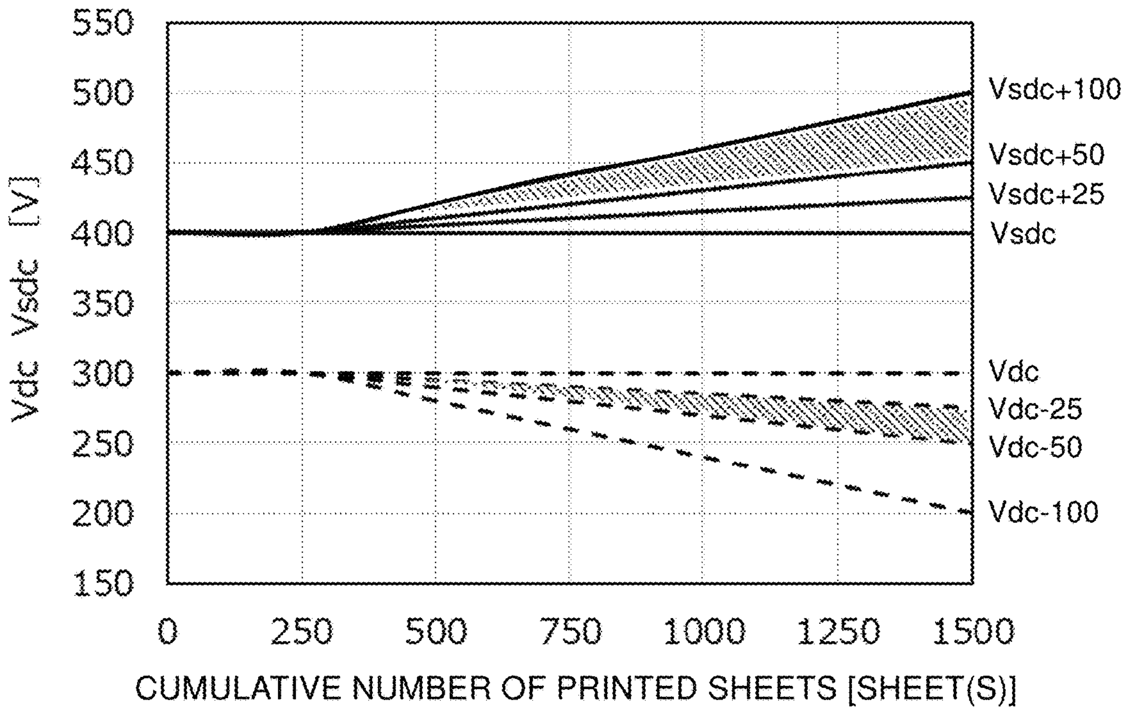
FIG. 7 is a graph showing respective variation amounts (correction amounts) of a development voltage Vdc and a supply voltage Vsdc with respect to a cumulative number of printed sheets.

FIG. 7 is a graph showing respective variation amounts (correction amounts) of a development voltage Vdc and a supply voltage Vsdc used in the endurance printing test with respect to the cumulative number of printed sheets. FIG. 7 shows corrections of the development voltage Vdc (a broken line) and the supply voltage Vsdc (a solid line) in a case where a target value of the life of the developing portion 33 is 1,500 sheets. To be more specific, there is shown a case where the supply voltage Vsdc is 400 V at an initial stage of the endurance printing test, and a maximum variation width (ΔVsdc) of the supply voltage Vsdc after printing of 1,500 sheets is 0 V, 25 V, 50 V, or 100 V. Similarly, there is shown a case where the development voltage Vdc is 300 V at the initial stage of the endurance printing test, and a maximum variation width (ΔVdc) of the development voltage Vdc after printing of 1,500 sheets is 0 V, 25 V, 50 V, or 100 V.

As shown in FIG. 7, at the initial stage of the endurance printing test, the supply voltage Vsdc is 400 V, the development voltage Vdc is 300 V, and a potential difference ΔAV (Vsdc−Vdc) is 100 V. From the initial stage to when a cumulative number of printed sheets of 250 sheets (16% of the life of the developing portion 33) is reached, initial performance of the toner can be maintained, so that there occurs almost no variation in density followability of a solid image. Consequently, the supply voltage Vsdc is maintained constant, and the development voltage Vdc also does not vary.

At or later than a time when the cumulative number of printed sheets of 250 sheets is reached, deterioration and consumption of the toner in the developing portion 33 progress, so that there occurs a variation in toner fluidity. Thus, as the cumulative number of printed sheets increases, the supply voltage Vsdc is increased to increase an amount of the toner supplied to the developing roller 331. Furthermore, as the cumulative number of printed sheets increases, the development voltage Vdc is decreased so that an amount of the toner supplied to the photosensitive drum 31 (a development amount) is constant.

In a test method adopted, an image of standard data stipulated in ISO/IEC 19752 was outputted in an A4 size as a test image. Further, comparisons were made of the density followability, a density maintaining property, and a toner consumption amount in a case where 1,500 sheets of such test images were printed using the supply voltage Vsdc and the development voltage Vdc that were made to vary as shown in FIG. 7.

For evaluation of the density followability, a reference character "G" denotes a case where density irregularities ($\Delta$ID) at a leading edge and a trailing edge of the image satisfy $\Delta ID<0.2$ (indicating a level at which density irregularities are recognizable), and a reference character "F" denotes a case where $\Delta ID\geq 0.2$. For evaluation of the density maintaining property, a reference character "G" denotes a case where an image density (ID) satisfies $ID\geq 1.2$ (indicating a level at which a decrease in density is recognizable), and a reference character "F" denotes a case where $ID<1.2$. For evaluation of the toner consumption amount, a reference character "G" denotes a case where a toner consumption amount per sheet of the test image is not more than 20 mg/sheet, and a reference character "F" denotes a case where the toner consumption amount per sheet of the test image exceeds 20 mg/sheet. Results thereof are shown in Table 1.

Figure 8:
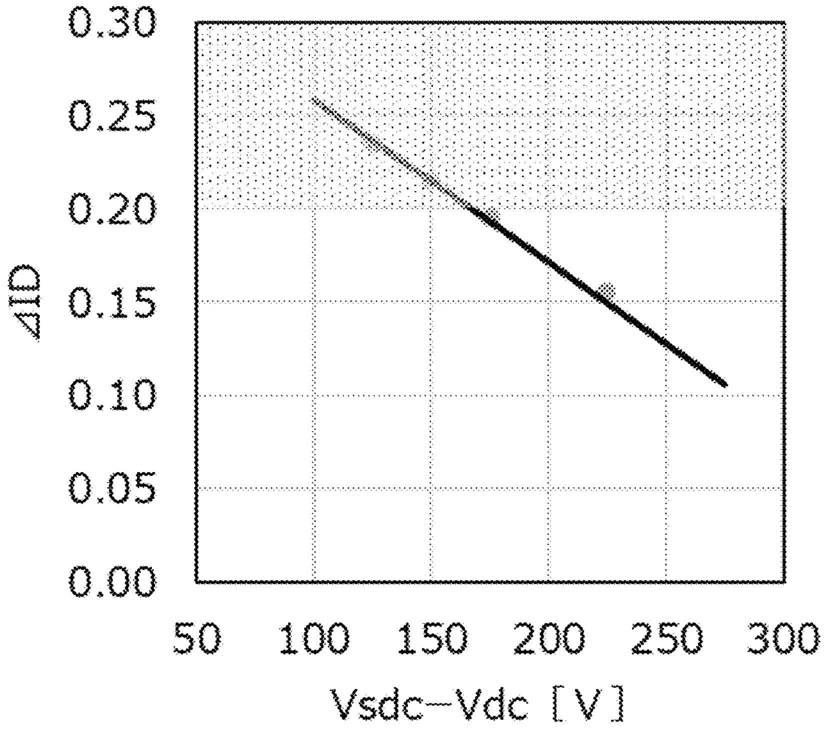
FIG. 8 is a graph showing a relationship between Vsdc−Vdc and ΔID in an endurance printing test.

As is apparent from Table 1, as for the density followability of a solid image, it has been confirmed that $\Delta ID<0.2$ as a standard range of acceptable density irregularities cannot be satisfied when 1,500 sheets are printed unless the potential difference (Vsdc−Vdc) between the supply voltage Vsdc and the development voltage Vdc satisfies $(Vsdc-Vdc)\geq 175$ [V]. FIG. 8 shows a relationship between Vsdc−Vdc and $\Delta$ID In FIG. 8, a dotted region represents a range in which the density followability does not satisfy $\Delta ID<0.2$.

Figure 9:
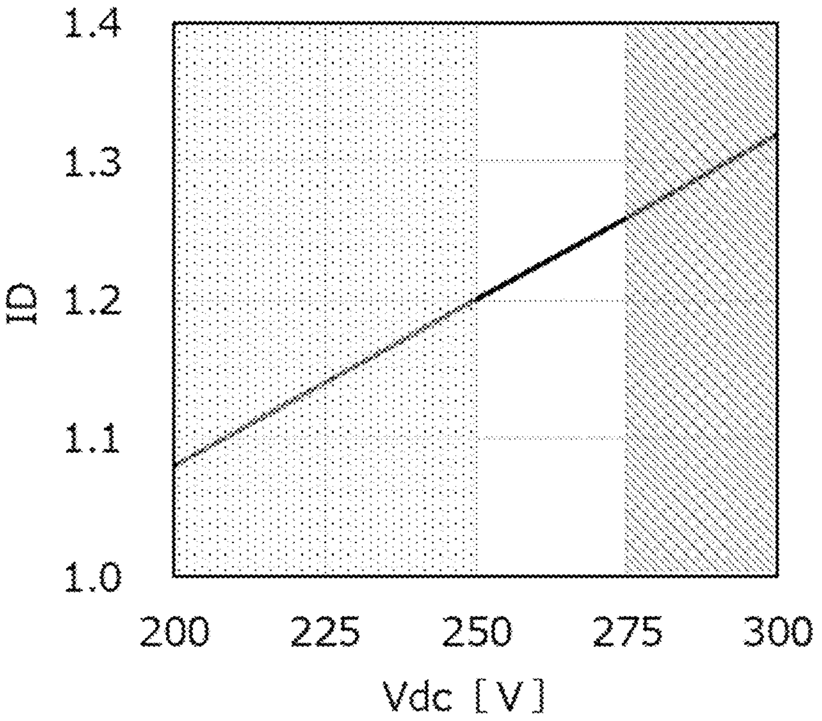
FIG. 9 is a graph showing a relationship among Vdc, ID, and a toner consumption amount in the endurance printing test.

It has also been confirmed that $ID\geq 1.2$ as a standard range of acceptable density values cannot be satisfied unless the development voltage Vdc satisfies $Vdc\geq 250$ [V]. It has further been confirmed that a current toner consumption amount of not more than 20 mg/sheet cannot be satisfied unless the development voltage Vdc satisfies $Vdc\leq 275$ [V]. FIG. 9 shows a relationship among Vdc, ID, and the toner consumption amount. In FIG. 9, a dotted region represents a range in which the density maintaining property does not satisfy $ID<1.2$, and a diagonally shaded region represents a range in which the toner consumption amount does not satisfy not more than 20 mg/sheet.

That is, in order to satisfy standards for all of the density followability, the density maintaining property, and the toner consumption amount of a solid image, it is required that the supply voltage Vsdc and the development voltage Vdc be set so that $(Vsdc-Vdc)\geq 175$ and $250\leq Vdc\leq 275$ are satisfied (shaded regions in Table 1).

The following has been confirmed. That is, in order to satisfy the density maintaining property and the toner consumption amount throughout the life of the developing portion 33 while adjusting the potential difference (Vsdc−Vdc) to 175 V so as to satisfy the density followability, it is required that a maximum variation amount $\Delta$Vsdc of the supply voltage Vsdc and a maximum variation amount $\Delta$Vdc of the development voltage Vdc be made to vary in accordance with the cumulative number of printed sheets as shown in FIG. 7, and the above cannot be achieved unless respective absolute values $|\Delta Vsdc|$ and $|\Delta Vdc|$ of the variation amounts (gradients) of the supply voltage Vsdc and the development voltage Vdc are adjusted to satisfy a relationship $|\Delta Vsdc|\geq|\Delta Vdc|$ (crosshatched regions in FIG. 7). This is conceivably because of the following reason.

That is, as the potential difference (Vsdc−Vdc) is increased, an amount of the toner conveyed on the developing roller 331 increases. Here, when there is applied, as the development voltage Vdc, a development voltage equal in value to that applied before the potential difference (Vsdc−Vdc) is increased, an amount of the toner moving onto the photosensitive drum 31 (the development amount) increases. It is, therefore, required to stabilize the amount of the toner moving onto the photosensitive drum 31 by decreasing the development voltage Vdc by an amount corresponding to an increase in the amount of the toner conveyed. Since the development voltage Vdc has a higher sensitivity to developability with respect to the photosensitive drum 31 than that of the supply voltage Vsdc, it is required that the variation amount $|\Delta Vdc|$ of the development voltage Vdc be not more than the variation amount $|\Delta Vsdc|$ of the supply voltage Vsdc.

According to the above-described results, the potential difference (Vsdc−Vdc) between the supply voltage Vsdc and the development voltage Vdc is increased in accordance with the cumulative number of printed sheets, and thus the density followability of a solid image can be improved. Furthermore, when the supply voltage Vsdc is increased, the development voltage Vdc is decreased, and the absolute value $|\Delta Vsdc|$ of a variation width of a supply voltage and the absolute value $|\Delta Vdc|$ of a variation width of a development voltage are set to satisfy $|\Delta Vsdc|\geq|Vdc|$. With this configuration, while the density maintaining property can be improved by increasing the amount of the toner supplied from the supply roller 332 to the developing roller 331, an increase in the toner consumption amount can be suppressed by stabilizing the amount of the toner moving from the developing roller 331 onto the photosensitive drum 31.

Furthermore, at the start of use of the developing portion 33 when the fluidity of the toner is unlikely to fluctuate, the supply voltage Vsdc and the development voltage Vdc are not made to vary, and from a point in time when 16% of the life of the developing portion 33 is reached, the potential difference (Vsdc−Vdc) between the supply voltage Vsdc and the development voltage Vdc is increased in accordance with the cumulative number of printed sheets. With this configuration, it is possible to simplify control by omitting unnecessary voltage control at an initial stage of the use of the developing portion 33 and to suppress an increase in the toner consumption amount due to an unnecessary increase in the amount of the toner supplied from the supply roller 332 to the developing roller 331.

The life of the developing portion 33 varies depending on an amount of the toner contained in the development housing 330, and the larger the amount of the toner contained in the development housing 330, the longer the life of the developing portion 33. Here, the larger the amount of the toner contained, the more unlikely toner deterioration is to progress. That is, the larger the amount of the toner contained, the more toner deterioration is suppressed, and there is also increased a cumulative number of sheets printed up to when the standards for the density followability, the density maintaining property, and the toner consumption amount of a solid image are no longer satisfied. Accordingly, when, regardless of a length of the life of the developing portion 33 (the amount of the toner contained), the control to vary the development voltage Vdc and the supply voltage Vsdc is executed at or later than a stage corresponding to 16% of the life of the developing portion 33, it is possible to satisfy the standards for the density followability, the density maintaining property, and the toner consumption amount of a solid image. For example, in a case where a target value of the life of the developing portion 33 is 3,000 sheets, the control to vary the development voltage Vdc and the supply voltage Vsdc could be executed at or later than a time when the cumulative number of printed sheets is 480 sheets.

5. Other Configurations

Figure 10:
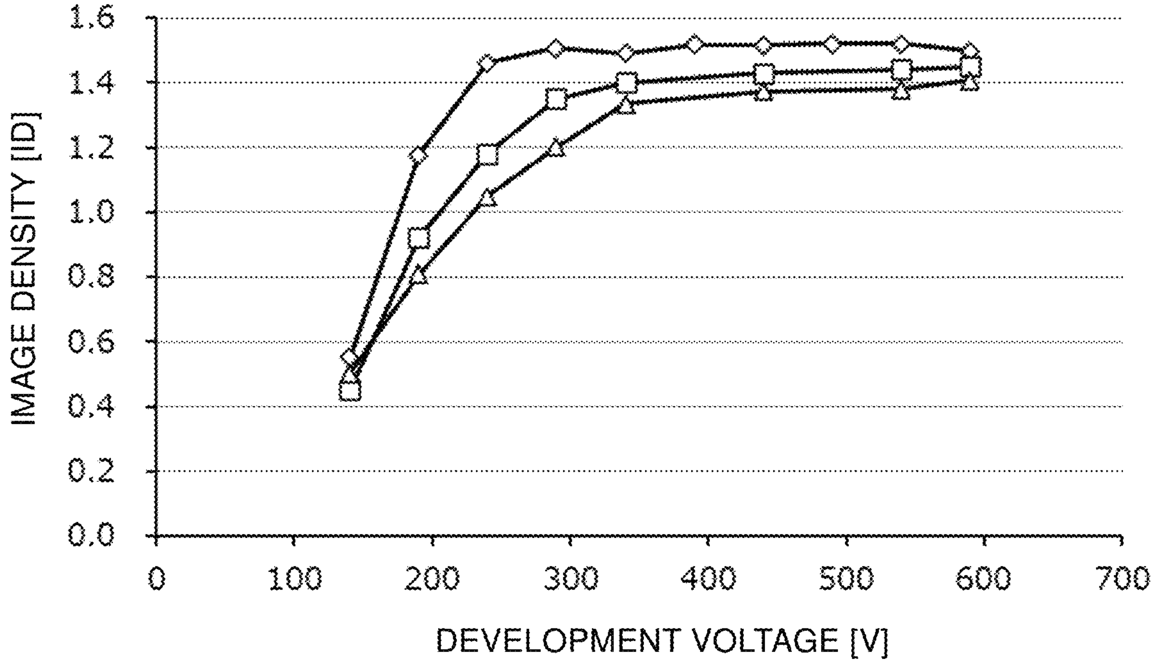
FIG. 10 is a graph showing a relationship between a development voltage applied to the developing roller and an image density (ID) in a case where a surface free energy of the developing roller is made to vary.

FIG. 10 is a graph showing a relationship between a development voltage applied to the developing roller 331 and an image density (ID) in a case where a surface free energy of the developing roller 331 is made to vary. The surface free energy corresponds to a surface tension of a liquid in a solid and refers to a molecular energy of a surface itself of the solid. In FIG. 10, a data series denoted with rhombuses indicates a case where the developing roller 331 has a surface free energy of 12 mJ/m$^2$, a data series denoted with squares indicates a case where the developing roller 331 has a surface free energy of 21 mJ/m$^2$, and a data series denoted with triangles indicates a case where the developing roller 331 has a surface free energy of 30 mJ/m$^2$.

As shown in FIG. 10, the higher the surface free energy of the developing roller 331, the more a development voltage usable range OW tends to be narrowed. This is because an upper limit value of such a pressing force of the developing roller 331 that white voids occur in a half-tone image decreases with increasing surface free energy of the developing roller 331. Preferably, the developing roller 331 has a surface free energy of not less than 5 mJ/m $^2$ and not more than 27 mJ/m$^2$.

Furthermore, an amount of the toner regulated by the regulation blade 334 varies also depending on a contact area ratio of the outer circumferential surface of the developing roller 331. The contact area ratio of the outer circumferential surface of the developing roller 331 refers to a ratio of an area of a region on the outer circumferential surface of the developing roller 331 excluding a concave (a non-contact part) to an area of the outer circumferential surface thereof. That is, the contact area ratio of the circumferential surface of the developing roller 331 represents a true contact area between the outer circumferential surface of the developing roller 331 and the regulation blade 334 with respect to an apparent contact area therebetween. The contact area ratio is preferably 4.5% to 10% and more preferably 6% to 8%.

A regulation pressure of the regulation blade 334 is preferably 10 N/m to 60 N/m and more preferably 15 N/m to 25 N/m. There is no particular limitation on a method for manufacturing the developing roller 331, and a surface roughness of the developing roller 331 may be adjusted by coating the developing roller 331 with a coat layer containing particles or may be adjusted merely by polishing.

Furthermore, in the present embodiment, both of a toner (a pulverized toner) manufactured by a pulverization method and a toner (a polymerized toner) manufactured by a polymerization method can be used. Due to its truly spherical shape having a high circularity, the polymerized toner is low in adhesion force to provide good development performance and thus has a broader usable range OW. The present disclosure is, therefore, particularly useful in the non-magnetic one-component development type that uses the pulverized toner less costly than the polymerized toner.

Furthermore, in the present embodiment, it is confirmed that the use of a toner having a central particle diameter of 6.0 μm to 8.0 μm provides excellent results. The reason for selecting a central particle diameter in this range is as follows. That is, a central particle diameter outside this range is not preferable in that a central particle diameter smaller than 6.0 μm leads to an increase in manufacturing cost of the toner, and a central particle diameter larger than 8.0 μm leads to an increase in consumption amount of the toner and thus to deterioration in fixability.

Furthermore, in the present embodiment, it is confirmed that the use of a toner having a circularity of 0.93 to 0.97 provides excellent results. A circularity outside this range is not preferable for the following reasons. That is, a circularity of not more than 0.93 tends to decrease image quality. A circularity of not less than 0.97 leads to a substantial increase in manufacturing cost.

Furthermore, in the present embodiment, it is confirmed that the use of a toner having a melt viscosity of not more than 100,000 Pa·s at 90° C. provides excellent results. A melt viscosity exceeding 100,000 Pa·s at 90° C. leads to deterioration in fixability of the toner and thus is not preferable from the standpoint of energy saving.

Furthermore, it is confirmed that a linear speed difference between the photosensitive drum 31 and the developing roller 331 in a range of 1.1 times to 1.6 times (a surface speed of the developing roller 331 is higher than that of the photosensitive drum 31) provides similar results. A linear speed difference smaller than 1.1 times leads to occurrence of fogging in which a toner adheres to a blank part of a sheet and thus is not preferable. On the other hand, a linear speed difference of not less than 1.6 times leads to an increase in driving torque or vibrations of the developing portion 33 or an increase in mechanical stress on the toner and thus is not preferable from the standpoint of a life of the apparatus.

Furthermore, it is confirmed that a surface potential VO in a range of 500 V to 800 V and a post-exposure potential VL in a range of 70 V to 200 V of the photosensitive drum 31 provide similar effects.

Other than the above, the present disclosure is not limited to the foregoing embodiment and can be variously modified without departing from the spirit of the present disclosure. For example, while the foregoing embodiment has described a monochrome printer as an example of the image forming apparatus 1, the present disclosure is applicable also to, for example, a color printer of a tandem type or a rotary type. Furthermore, the present disclosure is applicable also to an image forming apparatus such as a copy machine, a facsimile, or a multi-functional peripheral equipped with functions thereof. It is required, however, to include the photosensitive drum 31 and the developing portion 33 of the non-magnetic one-component development type.

Furthermore, while the photosensitive drum 31 in the foregoing embodiment uses a cylindrical raw tube as a support, a support having any other shape may also be used. Examples of the other shape may include a plate shape and an endless belt shape. Furthermore, while the photosensitive drum 31 in the foregoing embodiment uses an organic photoconductive layer (OPC), there may be provided, for example, an electric charge injection blocking layer that blocks injection of electric charges from the support.

The present disclosure is usable in an image forming apparatus including a developing device of the non-magnetic one-component development type using a non-magnetic toner. Through the use of the present disclosure, in a configuration using the non-magnetic one-component development type, it is possible to provide an image forming apparatus capable of, while suppressing image defects such as image density irregularities by use of a simple configuration, suppressing an increase in toner consumption amount by maintaining constant an amount of a toner supplied to a photosensitive member.

What is claimed is:

1. An image forming apparatus, comprising:

an image carrying member including a photosensitive layer formed on a surface thereof;

a charging device that charges the image carrying member to a prescribed surface potential;

an exposure device that exposes light to the surface of the image carrying member charged by the charging device so as to form thereon an electrostatic latent image with attenuated electrostatic charge;

a developing device including:

a development container for containing a non-magnetic one-component developer composed only of a toner;

a developer carrying member that is brought into pressure contact at a prescribed pressing force with the image carrying member and has an outer circumferential surface on which the toner is carried to form a toner layer;

a toner supply member that is brought into pressure contact at a prescribed pressing force with the developer carrying member and supplies the toner to the developer carrying member; and a regulation blade that contacts the outer circumferential surface of the developer carrying member so as to regulate a thickness of the toner layer formed on the outer circumferential surface of the developer carrying member, the developing device supplying the toner to the image carrying member on which the electrostatic latent image is formed;

a development voltage power supply that applies a development voltage Vdc to the developer carrying member and a supply voltage Vsdc to the toner supply member; and a control section that controls the development voltage power supply, wherein the control section performs control so that, as a cumulative drive time of the developing device from a start of use of the developing device increases, the supply voltage Vsdc becomes larger than a reference supply voltage and the development voltage Vdc becomes smaller than a reference development voltage, thus executing control to vary the development voltage Vdc and the supply voltage Vsdc so as to increase a potential difference Vsdc−Vdc between the supply voltage Vsdc and the development voltage Vdc.

2. The image forming apparatus according to claim 1, wherein an absolute value $|\Delta Vsdc|$ of a variation width of the supply voltage Vsdc and an absolute value $|\Delta Vdc|$ of a variation width of the development voltage Vdc satisfy $|\Delta Vsdc| \geq |\Delta Vdc|$.

3. The image forming apparatus according to claim 2, wherein the control section executes the control to vary the development voltage Vdc and the supply voltage Vsdc after there has been reached 16% of a life of the developing device, which is a period of time from the start of use of the developing device to when the toner in the development container runs out.

4. The image forming apparatus according to claim 3, further comprising:

a printed sheet number counting portion that counts a cumulative number of sheets printed from the start of use of the developing device, wherein based on the cumulative number of sheets printed, the control section estimates the life of the developing device.

* * * * *